Figure 1:
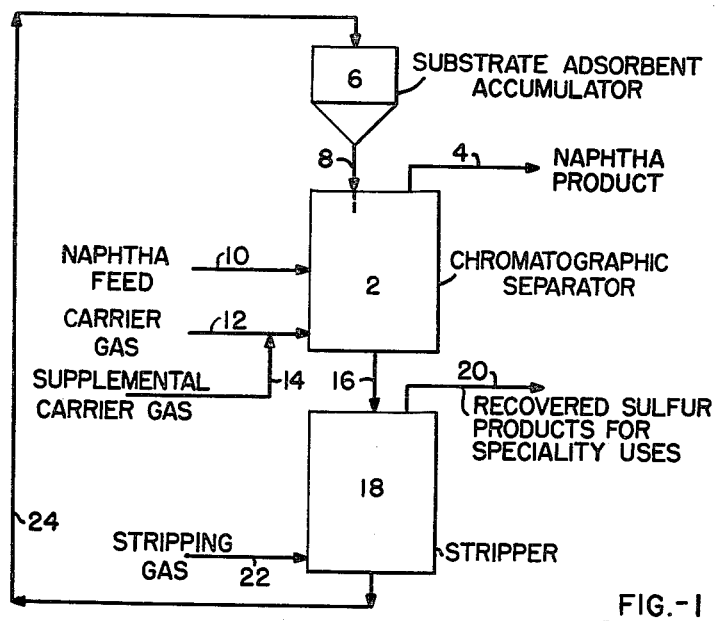

George Guttner
Ralph Burgess Mason
Glen Porter Hamner

United States Patent Office 3,090,748
Patented May 21, 1963

3,090,748
PROCESS FOR DESULFURIZATION EMPLOYING A NITRILE IMPREGNATED SUBSTRATE
George Guttner, Baton Rouge, Ralph Burgess Mason, Denham Springs, and Glen Porter Hamner, Baton Rouge, La., assignors to Esso Research and Engineering Company, a corporation of Delaware
Filed Nov. 17, 1959, Ser. No. 853,500
9 Claims. (Cl. 208—240)

The present invention relates to a method of desulfurizing naphthas and also to the segregation of aromatics from naphtha streams. More specifically, the present invention relates to the removal of sulfur contaminants and aromatics from naphthas, in particular those also containing aromatic constituents, employing a continuous gas chromatographic technique. Still more particularly, the present invention relates to the removal of sulfur compounds, particularly the more refractory sulfur compounds, such as thiophene and its homologues, from lower distillates, as well as the less refractory sulfur compounds, such as thioethers, mercaptans and sulfides. The present invention is especially useful in refining of distillates containing aromatic hydrocarbons in which it is desired to retain the aromatic hydrocarbons in the desulfurized oil together with other hydrocarbons, such as gasoline, wherein the aromatic hydrocarbons are desirable for improving the anti-knock properties of the fuel; but it may also be applied to fractions containing little or no aromatics. Also, the present invention is applicable in removing aromatic and sulfur compounds from the feed to aluminum halide isomerization of naphthas.

The process of the present invention involves employing a moving bed gas phase chromatographic operation. Though gas phase chromatography has become well recognized as an analytical tool, it has not yet been found feasible to adapt it to large scale commercial separations.

Gas chromatography is the selective adsorption of a particular hydrocarbon or hydrocarbon type by a solid phase adsorbent. In this respect it is similar to the classical liquid chromatography such as the adsorption of chlorophyll from solution by silica gel packed in a column. In this well known operation the adsorbent continues to remove the color bodies until the capacity of the adsorbent is reached which, with colored materials, is indicated by the color of the adsorbent and lack of color in the elutriate. Liquid chromatography has been extended to separation of hydrocarbon types such as aromatic separation with fixed beds of silica gel, molecular sieves and the like. As with color bodies the bed becomes progressively spent until it has no more capacity for the adsorbed type. Likewise, a bed containing a selective adsorbent will remove hydrocarbon types from a gas feed and the area of selective adsorption moves progressively through the bed as in liquid phase operation.

Such selective adsorbents have the property of holding the adsorbate tenaciously and unless a cyclic operation can be devised wherein the adsorbate is removed and the adsorbent is reactivated for further use the process is of no economical value. One method commonly employed is to purge with another solvent at an elevated temperature. It is obvious that alternate heating and cooling of a column for purging and reactivation is not desirable. The method disclosed in this specification obviates such obstacles by operating the chromatographic column as a moving bed so that the adsorbent is replaced by fresh material and thus the capacity is never exceeded. The adsorbent is continuously removed and is stripped of the adsorbate under different conditions and is recycled for use. In addition to the greater ease, convenience, and economy of operation the continuous gas phase chromatographic process provides for a greater throughput, thus providing further economies. In order to insure gas phase operation and to provide a good separation factor, the gas phase chromatographic operation herewith disclosed usually employs a carrier gas such as nitrogen or some inert gas stream.

The sulfur removal is accomplished by selective adsorption by a solid material which contains a suitable adsorbent on a substrate. Adsorbents include as a class materials having basic nitrogen compounds such as aromatic amines, urea, thiourea, nitriles and the like. Particularly useful are the substituted nitriles such as $\beta,\beta'$-oxydipropionitrile, $\beta,\beta'$-thiodipropionitrile, and $\beta,\beta'$-iminodipropionitrile. These are adsorbed on substrates including charcoal, clays, zeolites, firebrick, silica gel For the purpose of the present invention the dinitriles on firebrick are exceptionally useful because of its high retentive power.

In operation, the solid substrate impregnated with the adsorbent flows downwardly through the chromatographic separator, while the vaporized naphtha stream and a carrier gas flow upwardly countercurrent to the adsorbent. To obtain desulfurization with minimum aromatic loss, it is useful to employ supplemental carrier gases which will increase the relative volatility of aromatics with respect to sulfur compounds, such as thiophene and the like. In general, inert gases such as nitrogen, methane, carbon monoxide, are used as carrier gases. Supplemental carrier gases constitute one or more of undersaturated water vapor, undersaturated ethanol, isopropanol, ammonia, low boiling amines, and the like.

The process of the present invention may be understood more completely by reference to the accompanying drawing showing schematically a preferred embodiment thereof.

Turning now to FIGURE 1, a vaporized naphtha feed containing 0.001 to 0.05% by weight of sulfur and 2 to 10% aromatics is passed into chromatographic separator 2 via line 10. The naphtha may be heated at a temperature of 150° to 250° F. and temperatures in vessel 2 may be maintained at 150° to 200° F. A carrier gas, such as nitrogen, is admitted through line 12 and may be supplemented by one of the gases mentioned above. The carrier gas rate may be of the order of 100 to 500 c.f./b. of feed while the naphtha feed is at the rate of 0.05 to 0.5 pound per pound of solids.

Substrate-adsorbent of the nature previously described is flowed downwardly from accumulator 6 through line 8 into separator 2. This flow may be controlled by any desired means, such as a rotating disc at the lower portion of the separator. The solids rate is controlled to give a flow of 0.5 to 2 pounds per cubic foot of reactor space per minute. This is equivalent to a residence time of 10 to 60 minutes in the contacting zone between the feed inlet and product outlet.

Naphtha product substantially completely desulfurized is withdrawn, together with carrier gases, through line 4. It may be separated from the carrier gas and processed by any manner known per se.

The granulated adsorbent containing sulfur compounds is continuously withdrawn through line 16 and passed into stripping chamber 18. A stripping gas, such as nitrogen or methane, may be used. Stripping gas rates may be of the order of 0.1 to 10 cubic feet per pound of solids, and the stripping temperature is in the range of about 180° to 250° F. Sulfur products are withdrawn overhead through line 20, and may be recovered for specialty uses, such as conversion into products such as sulfuric dioxide, sulfuric acid and the like. Normally, some aromatics may also be present in this stream.

The finely divided solid adsorbent now stripped of adsorbate is continuously withdrawn downwardly through line 24 and recycled to hopper 6 for further adsorption of sulfur compounds.

The process as described is amenable to removal of sulfur compounds preferentially but precautions have to be observed when the feed contains appreciable amounts of aromatics. Under such conditions the process may be altered to (a) employ high stripping gas rates at the higher values of the temperature range which will take the aromatics overhead retaining the sulfur on the substrate, (b) remove all or part of the aromatics with the sulfur compounds with preferential stripping of the aromatics from the substrate, and (c) remove all or part of the aromatics with the sulfur compounds with complete stripping of the aromatic and sulfur adsorbate from the substrate in one operation. The stripped adsorbate is extractively distilled using the nitrile compound as a solvent. Of these (b) and (c) provide for the segregation of the aromatic in a relatively pure, essentially sulfur-free condition. This purified aromatic is either combined with the chromatographic overhead to maintain the high antiknock value of the fuel or is utilized as a purified aromatic stream.

When procedure (b) is employed, stripper 18 of FIGURE 1 is operated in two sections, the first under conditions of temperature and gas rate to remove the aromatics but not the sulfur compounds, and second under conditions of greater severity to remove the sulfur compounds. In these stripping operations of greater severity any tendency to remove the solvent from the substrate is obviated by presaturating the stripping gas with the solvent.

The process of the present invention may be subject to many modifications. Thus when it is desired to desulfurize a naphtha stream and concomitantly recover a high purity benzene fraction of 99.9% or higher purity, a modification shown in FIGURE 2 may be employed. The streams that may be treated in accordance with this modification include virgin naphthas, cracked naphthas, reformed naphthas, and the like, wherein the benzene content may range from about 3 to about 40% and the sulfur content, .0005 to .05%.

In this modification, azeotroping agent is added to the naphtha to provide a low boiling benzene azeotrope. When the chromatographic technique is employed, it is evident that materials boiling at approximately the benzene boiling point, or higher boiling materials that azeotrope with benzene at the latter's boiling point or a few degrees lower will have to be excluded because such contaminants will carry over when the adsorbed product is recovered. Thus, in the present modification shown in FIGURE 2 the naphtha stream is not fed directly into the chromatographic column. Instead, an azeotrope fraction distilling substantially lower than the benzene boiling point is fed to this zone. The preferred boiling range for the feed to the chromatographic column is about 140° to 165° F., the benzene boiling point being 176° F.

The completeness of benzene removal from the original feed in the form of the 140° to 165° F. azeotrope depends upon the relative quantities of benzene and azeotroping hydrocarbon present. When the latter is insufficient, the fractionator bottoms contain benzene which can be distilled in the desired range by combining with all or part of the raffinate from the adsorption, and distilling again in the desired range. Such technique provides for the substantial exclusion of paraffinic materials distilling close to or heavier than the benzene boiling point. The second distillation step may be avoided by recycle of the raffinate (adsorbate) to the original column which will provide sufficient low boiling hydrocarbon to carry all of the benzene overhead as the azeotrope. However, better control of the operation can be achieved with the two distillation towers.

Figure 2:
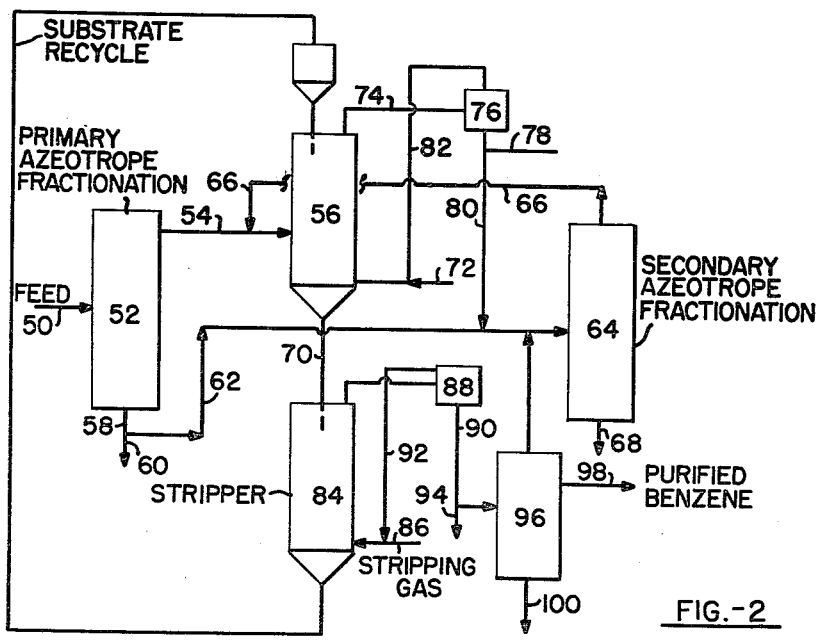

Turning now to FIGURE 2, a hydrocarbon feed ($C_{5+}$) from a virgin or cracked source is fed by line 50 to the primary azeotropic fractionator 52. Tower 52 is operated to recover an overhead fraction having a 140° to 165° F. boiling range that is removed by line 54, and this stream is then fed to the chromatographic column 56. Suitable substrate-adsorbent is fed continuously to the top of column 56. A carrier gas enters column 56 by line 72. The chromatographic column is operated at a temperature of approximately 175° F. The hydrocarbon feed now freed of benzene and sulfur is removed with the carrier gas by line 74. This stream is now suitable for isomerization feed, motor gasoline or jet fuel component. The stream is condensed by condenser 76 and may be removed from the process by line 78. If desired the stream may be recycled by line 80 to a secondary azeotropic fractionator 64 in order to azeotrope additional benzene from the original feed source. This partially de-hexanized stream is removed from column 52 by line 58 and is transferred by line 62 to secondary column 64.

The benzene portion plus small amount of sulfur removed from the 140° to 165° F. product is recovered with the substrate from column 56 by line 70. This stream is then fed to stripper 84, whereby the benzene and sulfur are stripped from the substrate, condensed in condenser 88 and removed from the process by line 90. The stripper section is operated at a temperature greater than 175° F. (200° to 300° F.). Stripping gas is fed to stripper 84 and is recycled to the stripper by line 92. The benzene-sulfur stream is fed to column 96 for additional purification. Conventional acid treating may be used to remove sulfur and any trace olefinic components that may be present. Heavy ends or polymers formed in the acid treating step are removed from column 96 by line 100.

The process of the present invention, and the results obtained thereby, may be further illustrated by the following specific examples.

*Example 1*

A vaporized $C_5/C_6$ naphtha stream was passed upwardly through a downwardly moving bed of firebrick. The solid adsorbent was prepared by adding 35 wt. percent $\beta,\beta'$-oxydipropionitrile to 35/60 mesh firebrick (Johns-Manville "Sil-O-Cel"). The adsorption conditions were as follows:

| | |
|---|---:|
| Temperature, °F | 172 |
| Adsorbent rates: | |
|     Cm./min. (down flow) | −2.54 |
|     G./min. | 4.0 |
| $C_5/C_6$ feed, cc./hr | 32–35 |
| Carrier gas ($N_2$), l./hr | 1.16 |

Under these conditions the sulfur content was reduced from 10 p.p.m. to 1 p.p.m.

*Example 2*

Under substantially the same conditions, the following feeds were desulfurized.

| Feed | Sulfur, p.p.m. at Start | Sulfur, p.p.m. in Product |
|---|---|---|
| n-$C_6$ + Thiophene | 380 | 1 |
| Cat. Cracked Light Naphtha | 290 | 1 |
| Steam Cracked $C_5$-$C_6$ Fraction | 5 | 1 |

*Example 3*

The continuous chromatographic vapor phase separation of benzene and sulfur from a $C_5/C_6$ virgin naphtha is shown by the following:

| | |
|---|---|
| Naphtha feed rate | 33 cc./hr. |
| Temperature | 172° F. |
| Substrate | 35% $\beta,\beta'$-oxydipropionitrile on firebrick. |
| Substrate rate | 7.3 cc./min. |
| Carrier gas ($N_2$) rate | 1.1 liters/hr. (185 c.f./b. on naphtha). |

After operation for 8 hours, no benzene was found in the naphtha product recovered, and the sulfur in this product stream was reduced to 1 part per million from a value of 10 parts per million in the feed. The recovered benzene, stripped from the substrate, was substantially of 100% purity.

What is claimed is:

1. An improved process for continuously removing small amounts of sulfur impurities from paraffinic hydrocarbon streams which comprises vaporizing said stream, passing said vaporous stream upwardly into a moving bed chromatographic adsorption separation zone, passing downwardly through said zone a finely divided substrate carrying a basic nitrogen containing adsorbent, passing an inert carrier gas into said zone, maintaining a temperature of from about 150° to 200° F. in said zone, withdrawing overhead a hydrocarbon stream substantially free of sulfur contaminants, passing downwardly a stream of substrate containing substantially all impurities adsorbed in said separation zone into a stripping zone, passing an inert stripping gas into said zone, stripping contaminants from said substrate and adsorbent, and cycling said purified substrate and adsorbent to said separation zone.

2. The process of claim 1 wherein said adsorbent is a substituted nitrile.

3. The process of claim 2 wherein said adsorbent is $\beta,\beta'$-oxydipropionitrile.

4. The process of claim 2 wherein said substrate is firebrick.

5. The process of claim 1 wherein said adsorbent-impregnated substrate is stripped with $N_2$ at a temperature above that obtaining in said adsorption zone.

6. The process of claim 1 wherein 2 to 10% aromatics are present in said hydrocarbon feed and are removed with said paraffins by addition into said adsorption zone of a supplemental carrier gas adapted to increase the relative volatility of aromatics over the sulfur compounds.

7. The process of claim 6 wherein said supplemental carrier gas is selected from the class consisting of undersaturated water vapor, undersaturated water soluble low boiling alcohols, and low boiling amines.

8. An improved process for removing sulfur and aromatic hydrocarbons from naphtha streams which comprises passing a naphtha stream containing such impurities to an azeotropic fractionation zone, withdrawing an overhead fraction having a boiling range of about 140° to 165° F., feeding said stream to a moving bed chromatographic adsorption separation zone, maintaining a temperature in said zone above said boiling range, but below 200° F., maintaining a downwardly moving bed of firebrick impregnated with $\beta,\beta'$-oxydipropionitrile in said zone, withdrawing a hydrocarbon stream substantially free of aromatics and sulfur from said zone, stripping aromatics and sulfur compounds from said impregnated substrate with a stripping gas, and recovering an aromatic fraction of a high degree of purity from said process.

9. The process of claim 8 wherein said initial naphtha stream contains benzene, and wherein at least a portion of said purified paraffinic hydrocarbon stream is passed to a second azeotropic fractionation zone wherein additional benzene is azeotroped from said first named naphtha stream.

References Cited in the file of this patent

UNITED STATES PATENTS

| 2,765,356 | Skinner | Oct. 2, 1956 |
| 2,859,256 | Hess et al. | Nov. 4, 1958 |
| 2,882,232 | Haines et al. | Apr. 14, 1959 |
| 2,882,326 | Jezl | Apr. 14, 1959 |

OTHER REFERENCES

Medcalf et al.: "Aromatics Recovery by Solvent Refining," Petroleum Refiner, vol. 30, No. 7, pp. 97–100, July 1951.